(12) United States Patent
Hertzberg et al.

(10) Patent No.: US 9,552,208 B2
(45) Date of Patent: Jan. 24, 2017

(54) SYSTEM, METHOD, AND COMPUTER PROGRAM PRODUCT FOR REMAPPING REGISTERS BASED ON A CHANGE IN EXECUTION MODE

(71) Applicant: NVIDIA Corporation, Santa Clara, CA (US)

(72) Inventors: Ben Hertzberg, Santa Clara, CA (US); Guillermo Juan Rozas, Los Gatos, CA (US); Alexander Christian Klaiber, Mountain View, CA (US); Nickolas Andrew Fortino, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 390 days.

(21) Appl. No.: 14/137,842

(22) Filed: Dec. 20, 2013

(65) Prior Publication Data

US 2015/0178085 A1    Jun. 25, 2015

(51) Int. Cl.
| | |
|---|---|
| *G06F 7/38* | (2006.01) |
| *G06F 9/00* | (2006.01) |
| *G06F 9/44* | (2006.01) |
| *G06F 9/30* | (2006.01) |
| *G06F 9/38* | (2006.01) |

(52) U.S. Cl.
CPC ....... *G06F 9/30189* (2013.01); *G06F 9/30109* (2013.01); *G06F 9/384* (2013.01)

(58) Field of Classification Search
CPC ... G06F 9/30189; G06F 9/384; G06F 9/30109
USPC .......................................................... 712/229
See application file for complete search history.

(56) References Cited

U.S. PATENT DOCUMENTS

| | | | | |
|---|---|---|---|---|
| 2009/0150647 A1* | 6/2009 | Mejdrich | ............ | G06F 9/30036 712/3 |
| 2009/0150648 A1* | 6/2009 | Mejdrich | ............ | G06F 9/30032 712/4 |

* cited by examiner

*Primary Examiner* — Chun-Kuan Lee
(74) *Attorney, Agent, or Firm* — Zilka-Kotab, PC

(57) ABSTRACT

A system, method, and computer program product are provided for remapping registers based on a change in execution mode. A sequence of instructions is received for execution by a processor and a change in an execution mode from a first execution mode to a second execution mode within the sequence of instructions is identified, where a first register mapping is associated with the first execution mode and a second register mapping is associated with the second execution mode. Data stored in a set of registers within a processor is reorganized based on the first register mapping and the second register mapping in response to the change in the execution mode.

17 Claims, 10 Drawing Sheets

| FP0 | Q0 |
| FP1 | Q1 |
| FP2 | Q2 |
| FP3 | Q3 |
| ⋮ | ⋮ |
| FP31 | Q31 |

*Fig. 3A*

| FP0 | D1 | D0 |
|---|---|---|
| FP1 | D3 | D2 |
| FP2 | D5 | D4 |
| FP3 | D7 | D6 |
| ⋮ | ⋮ | ⋮ |
| FP12 | D25 | D24 |
| FP13 | D27 | D26 |
| FP14 | D29 | D28 |
| FP15 | D31 | D30 |
| FP16 | | |
| ⋮ | ⋮ | ⋮ |
| FP31 | | |

*Fig. 3B*

| FP0 | | D0 |
|---|---|---|
| FP1 | | D1 |
| FP2 | | D2 |
| FP3 | | D3 |
| FP4 | | D4 |
| FP5 | | D5 |
| FP6 | | D6 |
| FP7 | | D7 |
| FP8 | | D8 |
| ⋮ | | ⋮ |
| FP31 | | D31 |

*Fig. 3C*

|     | Channel 405(2) | | Channel 405(0) | |
| --- | --- | --- | --- | --- |
| FP0 | S3 | S2 | S1 | S0 |
| FP1 | S7 | S6 | S5 | S4 |
| FP2 | S11 | S10 | S9 | S8 |
| FP3 | S15 | S14 | S13 | S12 |
| FP4 | S19 | S18 | S17 | S16 |
| FP5 | S23 | S22 | S21 | S20 |
| FP6 | S27 | S26 | S25 | S24 |
| FP7 | S31 | S30 | S29 | S28 |
| FP8 | | | | |
| ⋮ | ⋮ | ⋮ | ⋮ | ⋮ |
| FP31 | | | | |

*Fig. 4A*

| | | |
| --- | --- | --- |
| FP0 | | S0 |
| FP1 | | S1 |
| FP2 | | S2 |
| FP3 | | S3 |
| FP4 | | S4 |
| FP5 | | S5 |
| FP6 | | S6 |
| FP7 | | S7 |
| FP8 | | S8 |
| | ⋮ | ⋮ |
| FP31 | | S31 |

*Fig. 4B*

SYSTEM, METHOD, AND COMPUTER PROGRAM PRODUCT FOR REMAPPING REGISTERS BASED ON A CHANGE IN EXECUTION MODE

FIELD OF THE INVENTION

The present invention relates to processors, and more particularly to mapping registers associated with processors.

BACKGROUND

ARM® is a supplier of microprocessor technology, offering a range of microprocessor cores for a variety of application markets and architectures that allow a licensee to create a customized microprocessor. ARM® made an architectural choice in defining their scalar floating-point architecture. Rather than storing a single scalar value in each floating-point (FP) register (regardless of the size of the value), ARM® specified that each wide FP register hold the contents of several smaller scalar FP registers. For example, in the ARM® AArch32 architecture, four 32-bit scalar FP registers are packed into a 128-bit wide register. In contrast, the ARM® AArch64 architecture specifies that each FP register hold a single scalar or vector value, regardless of the size of the data to be stored in the register.

While packing allows for a greater number of smaller scalar FP registers, the smaller FP registers are constrained to 128-bit alignment. Vector operations assume 128-bit aligned registers, while scalar operations may require 32-bit aligned registers. Therefore, when 32 or 64 bit FP registers are packed into a 128-bit wide register, one or more of the 32 or 64 bit FP registers may not be aligned as needed to perform scalar operations. Providing two different register representations (e.g., 32-bit aligned and 128-bit aligned) is needed to support both the AArch64 and AArch32 architectures. However, both of the representations are not suitable for both scalar and vector operations. Thus, there is a need for addressing this issue and/or other issues associated with the prior art.

SUMMARY

A system, method, and computer program product are provided for remapping registers based on a change in execution mode. A sequence of instructions is received for execution by a processor and a change in an execution mode from a first execution mode to a second execution mode within the sequence of instructions is identified, where a first register mapping is associated with the first execution mode and a second register mapping is associated with the second execution mode. Data stored in a set of registers within a processor is reorganized based on the first register mapping and the second register mapping in response to the change in the execution mode.

BRIEF DESCRIPTION OF THE DRAWINGS

FIG. 3A illustrates a register mapping for a 128-bit vector execution mode, in accordance with one embodiment.

FIG. 3B illustrates another register mapping for a 128-bit vector execution mode, in accordance with one embodiment.

FIG. 3C illustrates a register mapping for a 64-bit scalar execution mode, in accordance with one embodiment.

FIG. 4A illustrates another register mapping for a 128-bit vector execution mode, in accordance with one embodiment.

FIG. 4B illustrates a register mapping for a 32-bit scalar execution mode, in accordance with one embodiment.

DETAILED DESCRIPTION

Figure 1:
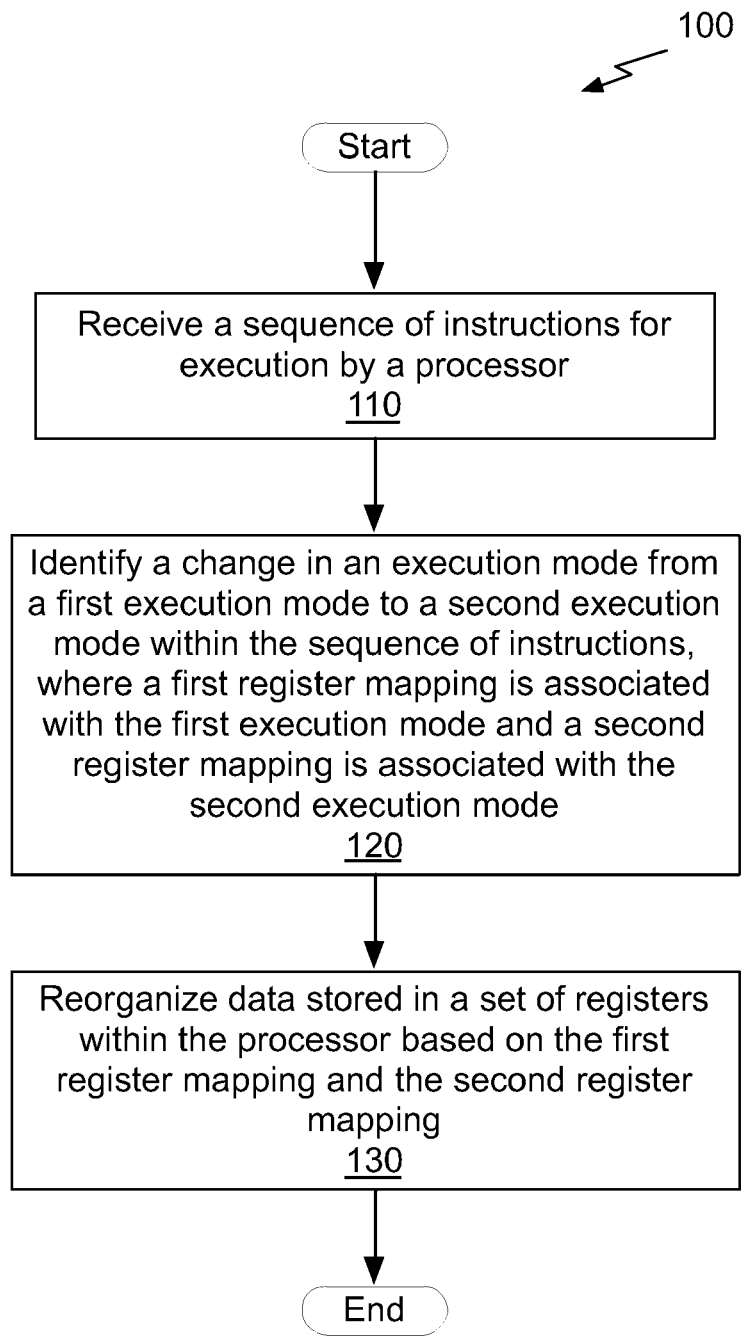
FIG. 1 illustrates a flowchart of a method for remapping registers based on a change in execution mode, in accordance with one embodiment.

FIG. 1 illustrates a flowchart of a method 100 for remapping registers based on a change in execution mode, in accordance with one embodiment. As shown in step 110, a sequence of instructions is received for execution by a processor. In the context of the following description, the sequence of instructions may include one or more instructions configured to perform scalar operations and one or more instructions configured to perform vector operations. The instructions specify architectural registers that store source and/or destination operands for the scalar and/or vector operations. The architectural registers are mapped to physical registers implemented as circuitry within the processor. In one embodiment, the architectural registers are mapped to physical registers according to the ARM® AArch32 architecture. In another embodiment, the architectural registers are mapped to physical registers according to the ARM® AArch64 architecture.

At step 120, a change in an execution mode from a first execution mode to a second execution mode within the sequence of instructions is identified. A first register mapping of the architectural registers to the physical registers is associated with a first execution mode and a second register mapping of the architectural registers to the physical registers is associated with a second execution mode. In the context of the following description, the execution mode is determined by operations specified by the instructions in the sequence of instructions. In one embodiment, a different execution mode is associated with scalar operations compared with vector operations. Additionally, one execution mode may be associated with 32-bit scalar operations and another execution mode may be associated with 64-bit scalar operations. In one embodiment, a first mapping of the architectural registers to physical registers for the 32-bit scalar operations may pack four 32-bit architectural registers into a 128-bit physical register, and a second mapping of the architectural registers to physical registers for the 64-bit scalar operations may pack two 64-bit architectural registers into the 128-bit physical register.

As shown in step 130, data stored in a set of physical registers within the processor is reorganized based on the first register mapping and the second register mapping. In one embodiment, data stored in the set of physical registers is preserved as part of the data reorganization. The data may be preserved by writing (i.e., copying or moving) a portion of the data to memory or to another subset of physical registers when the portion of the data will be overwritten to implement the second register mapping.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
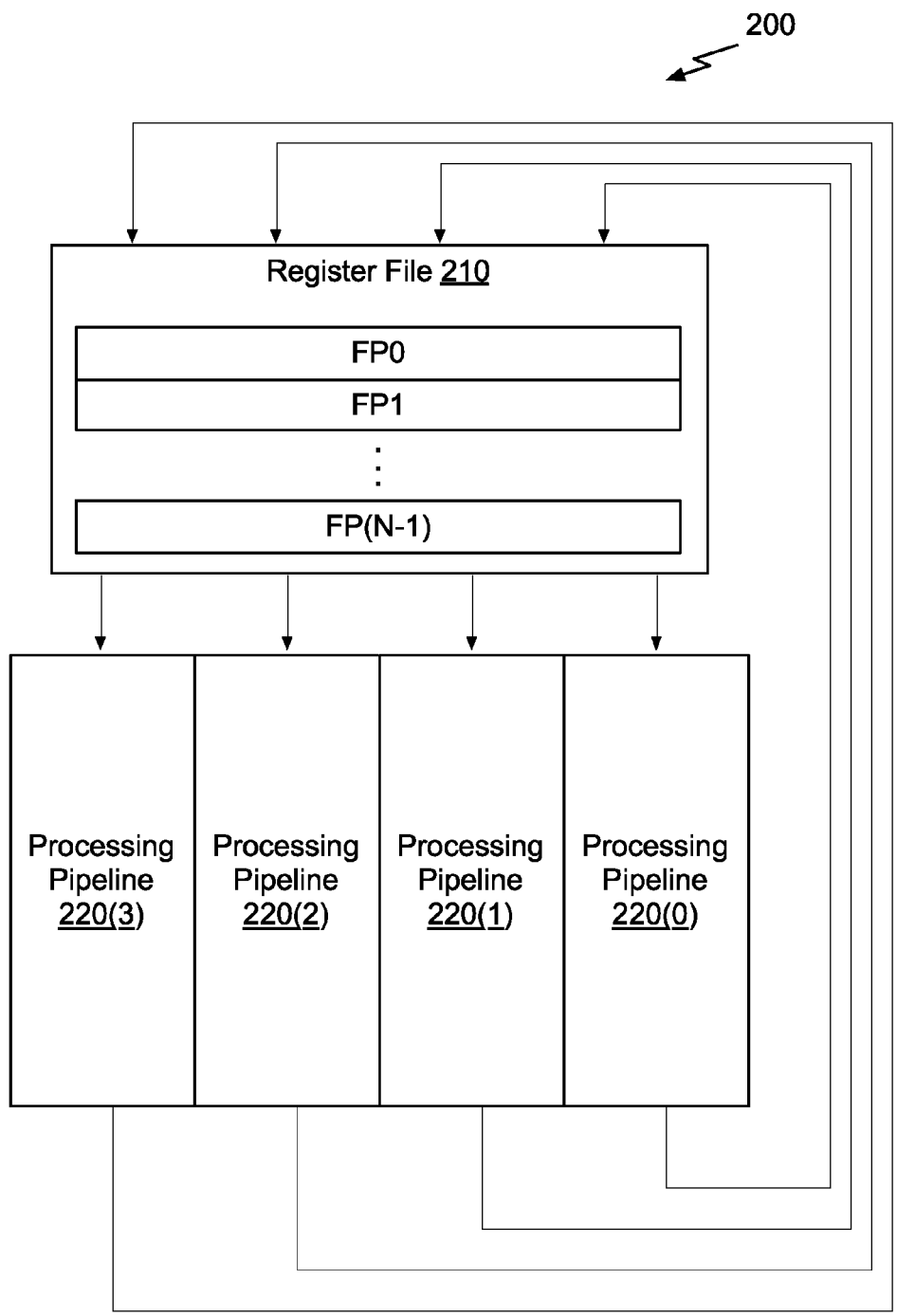
FIG. 2 illustrates a conceptual diagram of a portion of an execution unit, in accordance with one embodiment.

FIG. 2 illustrates a conceptual diagram 200 of a portion of an execution unit, in accordance with one embodiment. One or more execution units may be included in a processor, such as a central processing unit (CPU). As shown in FIG. 2, each processing unit may include four processing pipelines 220. In other embodiments, each processing unit includes more or less processing pipelines 220.

Each execution unit includes a register file 210 that provides a set of registers for the functional units of the execution unit. In one embodiment, the register file 210 is divided between each of the functional units such that each functional unit is allocated a dedicated portion of the register file 210. The register file 210 provides temporary storage for operands connected to the data paths of the functional units.

Each processing pipeline 220 may be a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. In another embodiment, each of the processing pipelines 220 is directly coupled to the registers in the register file 210 so that the bits input and output of the functional units directly correspond to the bits stored in the registers.

The register file 210 includes N physical registers, FP0 through FP(N−1), that are coupled to the inputs of the processing pipelines 220 to provide operands to the processing pipelines 220. The outputs of the processing pipelines 220 are directly coupled to the physical registers to store data output by the processing pipelines 220. In one embodiment, each FP register in the register file 210 stores 128 bits, and 32 of the 128 bits are routed to each of the processing pipelines 220. For example, FP0[127:96] is coupled to [31:0] of a first input to processing pipeline 220(3), FP0[95:64] is directly coupled to [31:0] of a first input to processing pipeline 220(2), FP0[63:32] is directly coupled to [31:0] of a first input to processing pipeline 220(1), and FP0[31:0] is directly coupled to [31:0] of a first input to processing pipeline 220(0). A second FP register may be coupled to provide 32 bits to each of the second inputs of the processing pipelines 220.

One or more of the FP registers may be directly or indirectly coupled (i.e., via a multiplexor or selector circuit) with the inputs to the processing pipelines 220. However, bits [127:96] of the FP registers are coupled only to processing pipeline 220(3), bits [95:64] of the FP registers are coupled only to processing pipeline 220(2), bits [63:32] of the FP registers are coupled only to processing pipeline 220(1), and bits [31:0] of the FP registers are coupled only to processing pipeline 220(0). This alignment between the bits of the FP registers and the processing pipelines 220 is well-suited to performing a vector operation on two 64-bit data or four 32-bit data in parallel, assuming that the data are 128-bit aligned. For example, the processing pipelines 220 may be configured to perform a vector multiply operation where FP0 and FP2 provide input operands to generate four 32-bit products or two 64-bit products that are stored back to one of FP0, FP2, or another FP register.

Different mappings of the architectural registers (e.g. ARM® architectural registers, etc.) to physical registers in the register file 210 may be defined. As a specific example, for systems that support both AArch64 and AArch32 architectures, at least two different register mappings are needed. The 128-bit ARM® architectural registers may be represented as Q0, Q1, Q2, . . . Q(N−1). The 64-bit ARM® architectural registers may be represented as D0, D1, D2, . . . D(N−1) and the 32-bit ARM® architectural registers may be represented as S0, S1, S2, . . . S(N−1).

The ARM® AArch32 architectural mapping to the physical registers FP0, FP1, FP2, . . . FP(N−1), as specified by ARM®, is: Q0={D1, D0}={S3, S2, S1, S0}; Q1=(D3, D2)=(S7, S6, S5, S4), and so on. Being less than 128 bits, the D and S architectural registers are packed into the FP physical registers. When the ARM® AArch32 architectural mapping is used to map the S and D architectural registers to the physical registers in the register file 210, only a portion of the register file 210 is consumed (i.e., one-quarter or one-half, respectively).

Figure 3A:
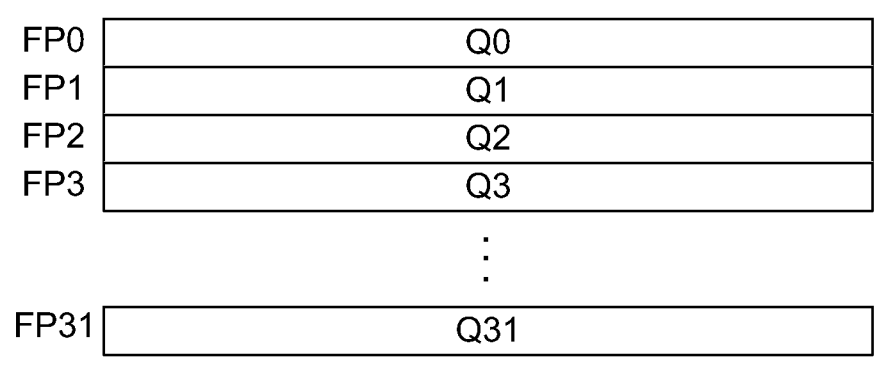

FIG. 3A illustrates a "Q" register mapping for a 128-bit vector execution mode, in accordance with one embodiment. As previously described, the FP registers are physical registers implemented in circuitry. The Q0 through Q31 registers are architectural registers that specify operands for instructions. When 128-bit "Q" architectural registers are mapped to the register file 210, each "Q" architectural register is mapped to a respective FP register and the "Q" registers are 128-bit aligned. In a sequence of instructions, "Q" registers are used to specify operands for vector operations and correspond to a vector execution mode.

FIG. 3B illustrates another register mapping for a 128-bit vector execution mode, in accordance with one embodiment. The D0 through D31 registers are architectural registers that specify operands for instructions. When two 64-bit "D" architectural registers are mapped to the register file 210 using the "Q" register mapping, two "D" architectural registers are packed into an FP register. As a result of the packing, half of the FP registers may not be used. In an alternate embodiment twice as many "D" architectural registers may be available (e.g., 2N instead of N). The "Q" mapping results in "D" registers that are 128-bit aligned and this alignment is not necessarily well-suited to performing scalar operations on the "D" architectural registers ("D" registers).

As shown in FIG. 3B, the "D" registers D0, D2, D4, and so on that are labeled are aligned to provide an input operand to the processing pipelines 220(0) and 220(1). Similarly, the "D" registers D1, D3, D5, and so on, are aligned to provide an input operand to the processing pipelines 220(2) and 220(3). Before scalar operations are performed by one or more instructions, the data stored in the FP registers should be reorganized and the mapping of the registers should be changed from the "Q" mapping associated with the vector execution mode to a "D" mapping associated with a scalar execution mode for "D" registers (e.g., 64-bit architectural registers).

The "D" registers may be mapped using the "Q" mapping to support the ARM®AArch32 architecture for instructions that perform vector operations. When the ARM® AArch64 architecture is supported, the mapping may be changed to support a "D" mapping for instructions that perform scalar operations. For example, when the "Q" mapping is used as shown in FIG. 3A, a scalar operation that sums the data stored in D0 and either D1 or D3 cannot be performed without first reorganizing the data stored in the FP0 and/or FP1 registers to align the operands into a single 64-bit aligned channel, where a first channel corresponds to the processing pipelines 220(0) and 220(1) and a second channel corresponds to the processing pipelines 220(2) and 220(3).

FIG. 3C illustrates a "D" register mapping for a 64-bit scalar execution mode, in accordance with one embodiment. A single "D" register is mapped to a corresponding FP register in the register file 210. In contrast with the "Q" mapping, scalar operations may be performed without reorganizing the data stored in the FP registers. For example, a scalar operation that sums D0 and either D1 or D3 can be performed. The "D" register mapping may be used to support the ARM® AArch64 architecture.

FIG. 4A illustrates another register mapping for a 128-bit vector execution mode, in accordance with one embodiment. The S0 through S31 registers are architectural registers that specify operands for instructions. When the "Q" mapping is used, four 32-bit architectural registers are packed into an FP register. As a result of the packing, three-quarters of the FP registers may not be used. The register mapping shown in FIG. 4A corresponds to that specified for the ARM® AArch32 architecture and corresponds to a vector execution mode.

As shown in FIG. 4A, the registers S0, S4, S8, and so on that are labeled as a channel 405(0) are aligned to provide an input operand to the processing pipeline 220(0). Similarly, the registers S2, S6, S10, and so on that are labeled as a channel 405(2) are aligned to provide an input operand to the processing pipeline 220(2). The "S" registers S1, S5, S9, and so on, are aligned in a separate channel (not explicitly labeled) to provide an input operand to the processing pipeline 220(1) and the "S" registers S3, S7, S11, and so on, are aligned in another separate channel (not explicitly labeled) to provide an input operand to the processing pipeline 220(3).

The 32-bit "S" architectural registers are 128-bit aligned when the "Q" mapping is used and this alignment is not necessarily well-suited to performing scalar operations on the 32-bit architectural registers. "S" registers in the same channel can provide operands for a particular scalar operation that is performed by a processing pipeline 220. "S" registers that are in different channels cannot easily provide operands for a particular scalar operation that is performed by a processing pipeline 220. For example, a scalar operation that sums the data stored in S0 and either S2 or S6 cannot be performed without first reorganizing the data stored in the FP0 and/or FP1 registers to align the operands into a single channel. Before scalar operations are performed by one or more instructions, the data stored in the FP registers should be reorganized and the mapping of the registers should be changed from "Q" mapping associated with the vector execution mode to a mapping associated with a scalar execution mode.

FIG. 4B illustrates an "S" register mapping for a 32-bit scalar execution mode, in accordance with one embodiment. A single "S" register is mapped to a corresponding FP register in the register file 210. In contrast with the "Q" mapping, scalar operations may be performed without reorganizing the data stored in the FP registers. For example, a scalar operation that sums S0 and either S1 or S3 can be performed. The "S" register mapping may be used to support the ARM® AArch64 architecture.

Figure 4C:
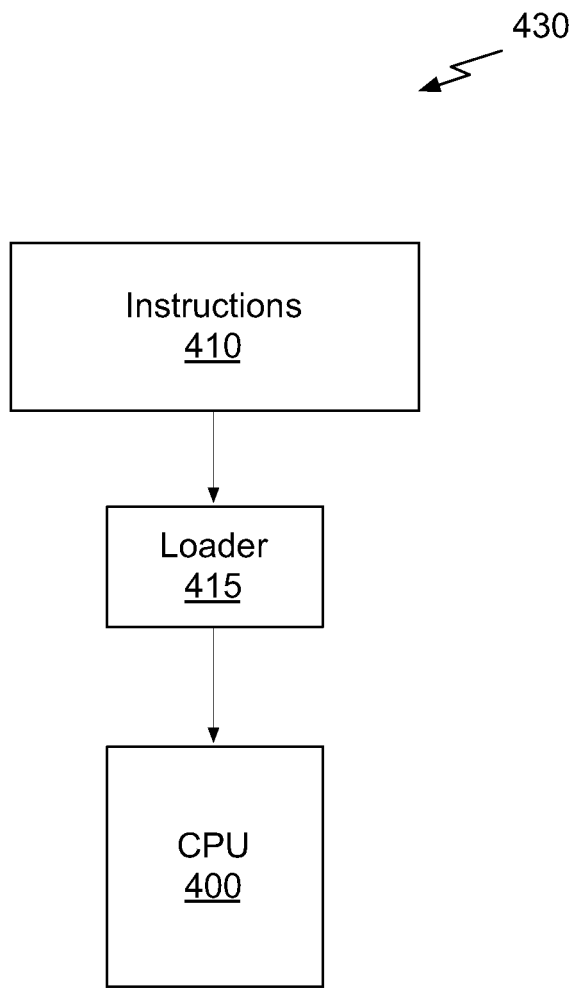
FIG. 4C illustrates a system for identifying a change in execution mode and remapping registers, in accordance with one embodiment.

FIG. 4C illustrates a system 430 for identifying a change in execution mode and remapping registers, in accordance with one embodiment. A sequence of instructions 410 may include instructions that perform vector operations and instructions that perform scalar operations. The "Q" mapping is well-suited for execution of instructions that perform vector operations and the "D" and "S" mappings are well-suited for execution of instructions that perform scalar operations. The instructions 410 are typically stored in a system memory that is accessible to the CPU 400. A loader 415 that is executed by the CPU 400 and configured to translate the instructions 410 for execution by the CPU 400 may also be stored in the system memory.

In one embodiment, the loader 415 may analyze the instructions 410 to identify changes in the execution mode (e.g., a change from vector to scalar operations or from scalar to vector operations) and reorganize the data stored in the register file 210 from a first register mapping to a second register mapping when an execution mode change is identified. In one embodiment, a change in the execution mode is identified by determining the type of operation (e.g., scalar, vector, or other) performed by each instruction. In another embodiment, a change in the execution mode is identified by determining the type of architectural registers (e.g., Q, S, and D) used as operands for each instruction. The loader 415 may implement the reorganization by inserting one or more instructions into the instructions 410. When executed by the CPU 400, the one or more instructions inserted by the loader 415 may preserve data stored in one or more FP registers and then reorganize the data stored in the FP registers to copy or move data within a single FP register or between two FP registers.

Alternatively, the one or more instructions inserted by the loader 415 may indicate the identified change in execution mode and circuitry within the CPU 400 implements the reorganization of the data to change from a first register mapping to a second register mapping according to the change in execution mode. In another embodiment, the loader does not analyze the instructions 410 to identify changes in execution modes, and instead, the CPU 400 analyzes the translated instructions 410 and reorganizes the data stored in the register file 210 when an execution mode change is identified. In sum, the analysis of the instruction 410, identification of an execution mode change, and reorganization of the data stored in the register file 210 may be performed by software (e.g., loader 415), circuitry (e.g. CPU 400), or a combination of software and circuitry. Whether the analysis is performed by software or circuitry, the execution mode corresponding to each instruction in the instructions 410 may be tracked to detect the changes in execution mode. The current execution mode may be stored and compared with the execution mode corresponding to each subsequent instruction and may be updated when the execution mode changes.

As shown in FIG. 4C, the system 430 includes a CPU 400, and the CPU may include the register file 210 and one or more processing pipelines 220 (shown in FIG. 2). It should be strongly noted that the CPU 400 is set forth for illustrative purposes only, and any processor may be employed to supplement and/or substitute for the same. In one embodiment, the CPU 400 implements an ARM® architecture. The CPU 400 may be included in a desktop computer, a laptop computer, a tablet computer, a smart-phone (e.g., a wireless, hand-held device), personal digital assistant (PDA), a digital camera, a hand-held electronic device, and the like. In one embodiment, the CPU 400 is embodied on a single semiconductor substrate. In another embodiment, the CPU 400 is included in a system-on-a-chip (SoC) along with one or more other logic units such as a graphics processing unit (GPU), a memory management unit (MMU), a digital-to-analog converter (DAC), and the like.

In one embodiment, the CPU 400 may be included on a card that includes one or more memory devices. The card may be configured to interface with a PCIe slot on a motherboard of a desktop computer that includes, e.g., a northbridge chipset and a southbridge chipset.

Figure 5A:
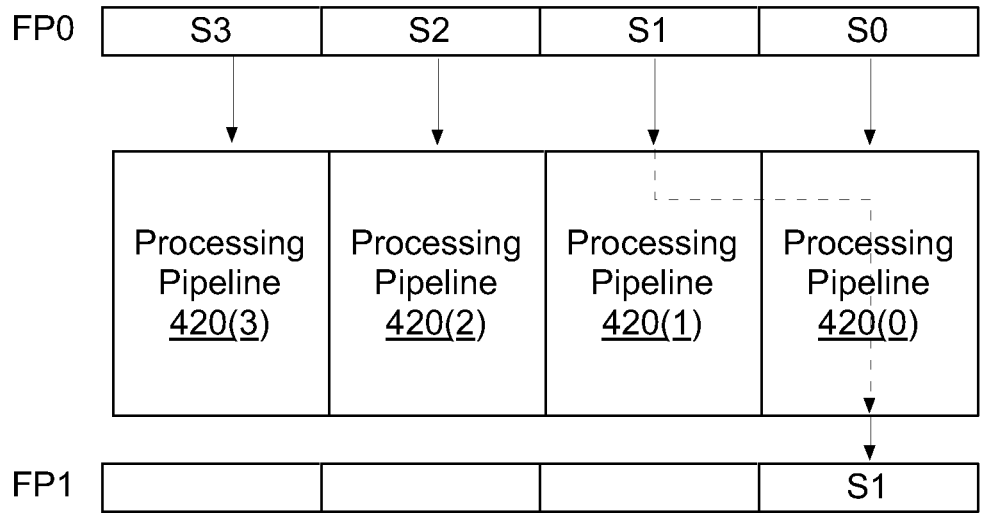
FIG. 5A illustrates an example reorganization of data stored in a set of registers, in accordance with one embodiment.

FIG. 5A illustrates an example reorganization of data stored in a set of registers, in accordance with one embodiment. The "Q" register mapping is used to store the "S" architectural registers in FP0. The register mapping needs to be changed from the "Q" register mapping to the "S" register mapping in response to an execution mode change from 128-bit vector operations to 32-bit scalar operations. The S1 architectural register is moved from FP0 to FP1 and S1 is moved from channel 405(1) to channel 405(0). The processing pipelines 220(1) and 220(0) are configured to move S1 from channel 405(1) to channel 405(0). However, during the move operation, other operations cannot typically be performed by the processing pipelines 220(1) and 220(0).

Figure 5B:
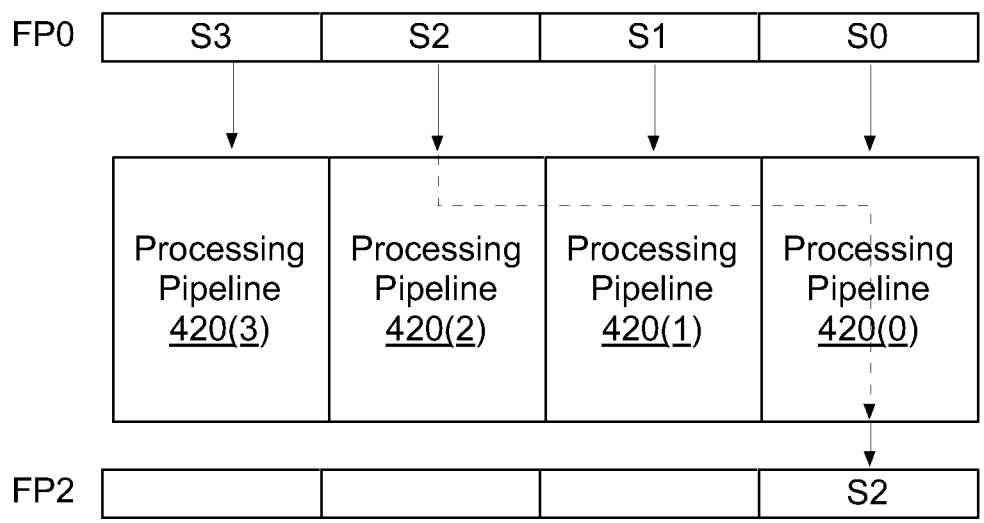
FIG. 5B illustrates another example reorganization of data stored in the set of registers, in accordance with one embodiment.

FIG. 5B illustrates another example reorganization of data stored in the set of registers, in accordance with one embodiment. To change the register mapping from the "Q" register mapping to the "S" register mapping, the S2 architectural register is moved from FP0 to FP2 and S2 is moved from channel 405(2) to channel 405(0). The processing pipelines 220(2), 220(1), and 220(0) are configured to move S2 from channel 405(2) to channel 405(0).

Figure 5C:
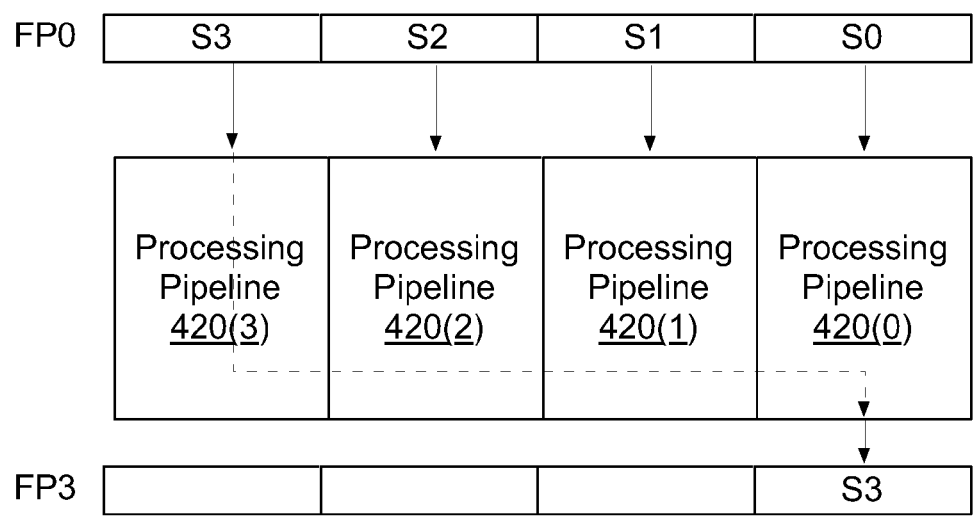
FIG. 5C illustrates another example reorganization of data stored in the set of registers, in accordance with one embodiment.

FIG. 5C illustrates another example reorganization of data stored in the set of registers, in accordance with one embodiment. To complete the change the register mapping from the "Q" register mapping to the "S" register mapping, the S3 architectural register is moved from FP0 to FP3 and S3 is moved from channel 405(3) to channel 405(0). The processing pipelines 220(3), 220(2), 220(1), and 220(0) are configured to move S3 from channel 405(3) to channel 405(0). If the execution mode changes so that the register mapping changes back to "Q" from "S", the process shown in FIGS. 5A, 5B, and 5C may be reversed.

When other data is stored in registers FP1, FP2, and FP3, that data may need to be preserved by storing it to different FP registers or to another memory before S1, S2, and S3 are written (e.g., moved or copied) to FP1, FP2, and FP3, respectively. In one embodiment, a first portion of the FP registers in the register file 210 are mapped using a first register mapping and a second portion (exclusive compared with the first portion) of the FP registers in the register file 210 are mapped using a second register mapping. For example, FP0, FP1, FP2, . . . FP7 may use the "S" mapping while FP8, FP9, . . . FP31 use the "D" mapping.

A typical program may include hundreds or thousands of instructions that perform vector operations before the execution mode changes from vector to scalar. Therefore, the latency incurred for reorganizing the data stored in the register file 210 may be amortized over many instruction execution cycles during which vector or scalar operations are performed. An alternative is to only reorganize the registers that are accessed for each instruction and then restore those registers after each instruction is executed. Reorganizing per-instruction may be more efficient than reorganizing all of the FP registers storing data in the register file 210 when only a small number of instructions use a particular execution mode.

The CPU 400 may be configured to monitor the latency incurred for reorganizing the data and track the number of FP register accesses between changes in the execution mode that cause the data to be reorganized. If the number of register accesses is less than a threshold value, then the per-instruction reorganization may be used instead of reorganizing all of the FP registers storing data in the register file 210. The number of register accesses that use a different mapping can be compared with the reorganization latency when all of the FP registers storing data in the register file 210 are reorganized to determine if the latency should be incurred once for many FP registers or per-instruction.

Figure 5D:
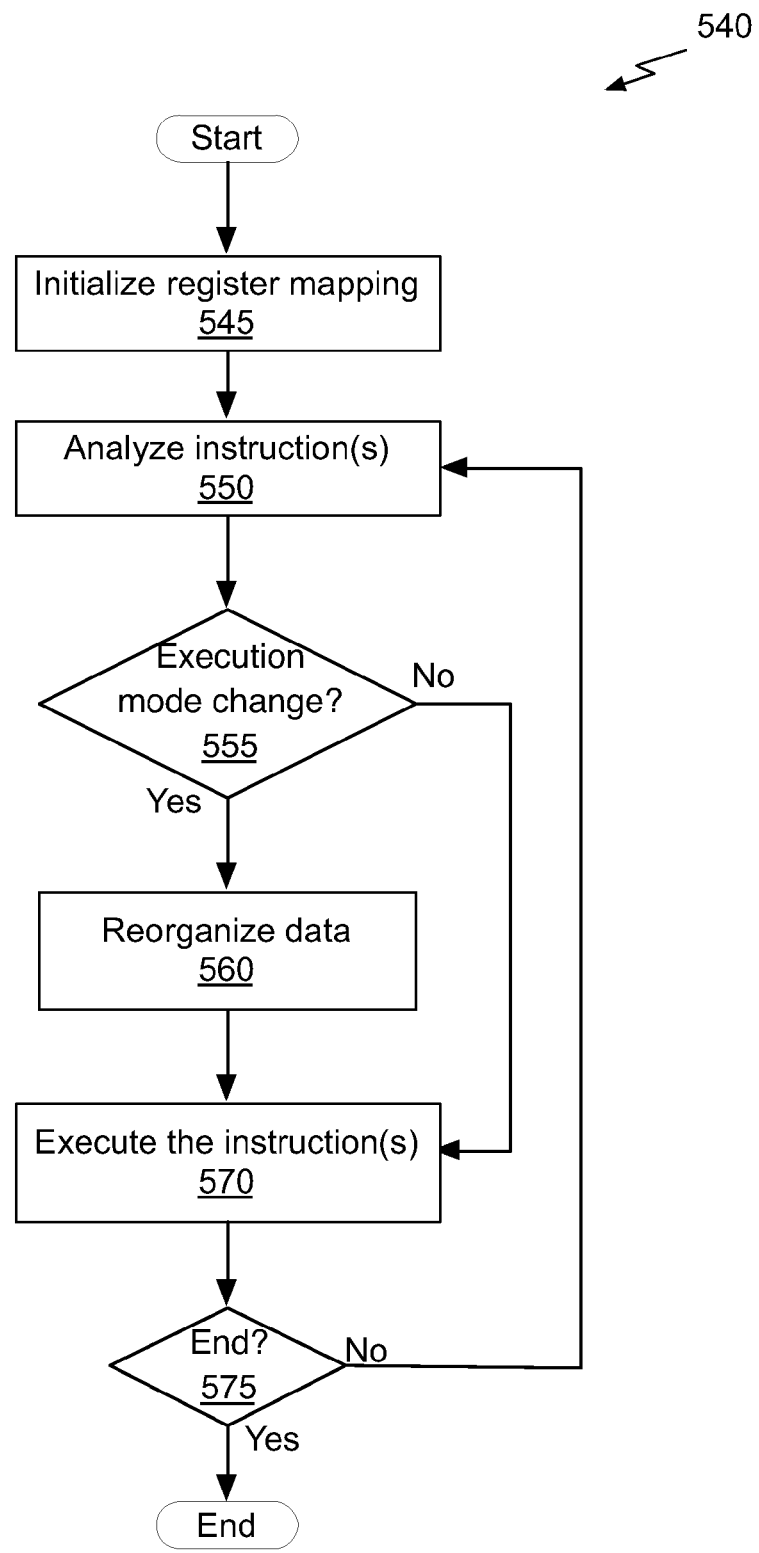
FIG. 5D illustrates another flowchart of a method for remapping registers based on a change in execution mode, in accordance with one embodiment.

FIG. 5D illustrates another flowchart of a method 540 for remapping registers based on a change in execution mode, in accordance with one embodiment. As shown in step 545, the register mapping of the architectural registers to the physical registers is initialized for a sequence of instructions. The tracked execution mode associated with the register mapping may also be initialized. At step 550, one or more instruction(s) in the sequence of instructions are analyzed to identify whether an execution mode change occurs for an instruction. Software or circuitry may be configured to analyze one instruction at a time or a set of instructions to identify execution mode changes. If, at step 555, an execution mode change is not identified, then, at step 570, the instruction(s) are executed using the current register mapping.

Otherwise, at step 560, data that may be overwritten during the reorganization is preserved and the data stored in the register file 210 is reorganized to change from one register mapping to another register mapping. At step 570, the instruction(s) are executed using the new register mapping. In one embodiment, step 570 may be performed by hardware after all of the instructions have been analyzed by software. At step 575, the software or circuitry (whichever implements the analysis of the instructions) determines if the end of the sequence of instructions is reached, and, if so the method terminates. Otherwise, the software or circuitry returns to step 550.

Figure 6:
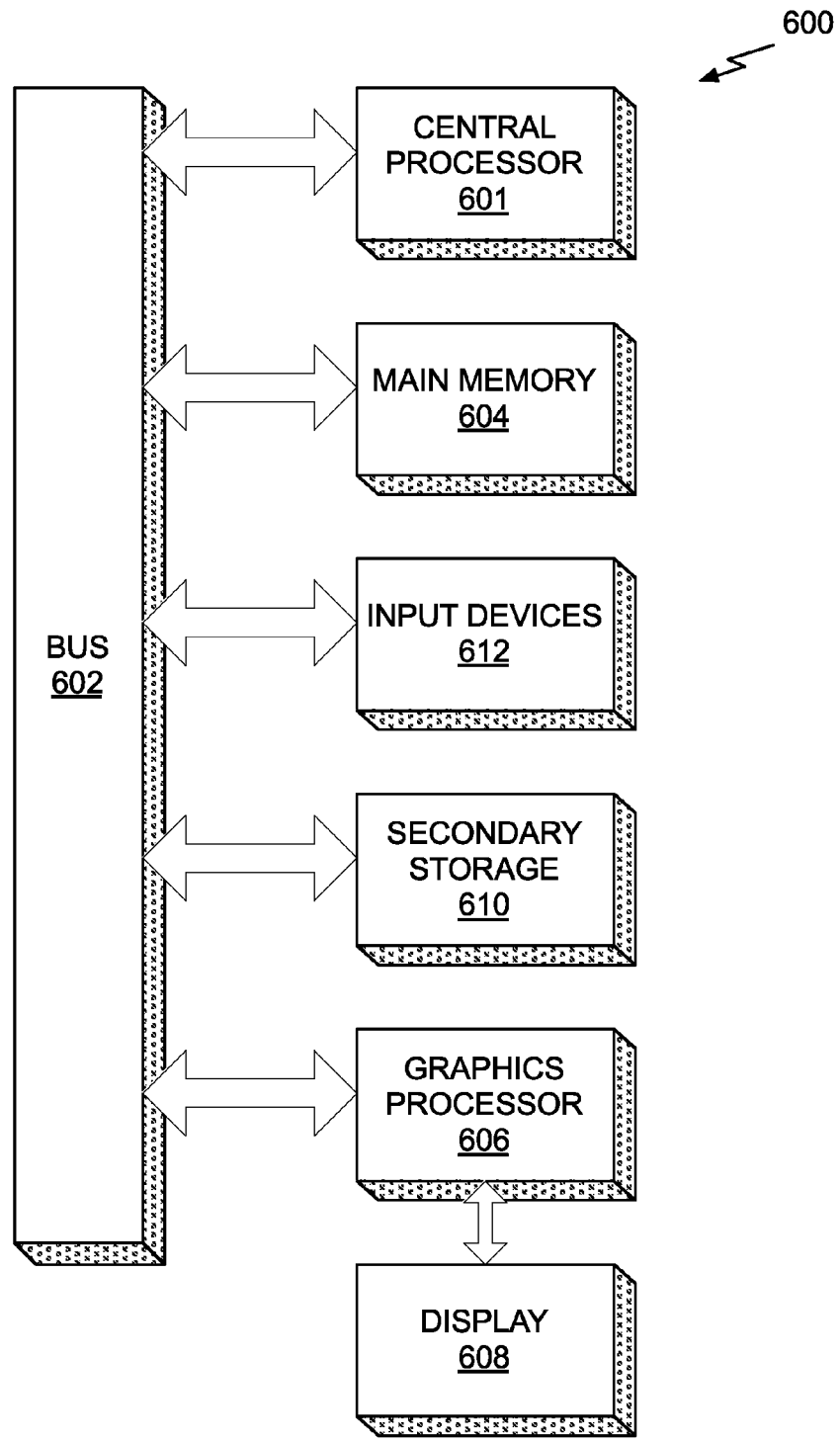
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The central processor 601 may be the CPU 400. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The main memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   receiving a sequence of instructions for execution by a processor;
   identifying a change in an execution mode from a first execution mode to a second execution mode within the sequence of instructions, wherein a first register mapping is associated with the first execution mode and a second register mapping is associated with the second execution mode;
   reorganizing data stored in a set of registers within a processor based on the first register mapping and the second register mapping in response to the change in the execution mode, wherein the first execution mode is used to perform vector operations on the data stored in the set of registers and the second execution mode is used to perform scalar operations on the data stored in the set of registers; and
   monitoring latency incurred for the reorganizing of the data and a number of register accesses between changes in the execution mode.

2. The method of claim 1, wherein the reorganizing comprises inserting at least one instruction into the sequence of instructions to copy data from a first register in the set of registers to a second register in the set of registers.

3. The method of claim 1, wherein the reorganizing comprises inserting at least one instruction into the sequence of instructions to move data from a first portion of a first register in the set of registers to a second portion of the first register.

4. The method of claim 1, wherein the reorganizing comprises inserting at least one instruction into the sequence of instructions indicating the change in the execution mode.

5. The method of claim 1, wherein the scalar operations are 32-bit floating point scalar operations.

6. The method of claim 1, wherein the scalar operations are 64-bit floating point scalar operations.

7. The method of claim 1 wherein the vector operations are 128-bit floating point vector operations.

8. The method of claim 1, wherein the reorganizing comprises:
   writing a first portion of the data that is stored in a first subset of registers within the set of registers in a second subset of registers within the set of registers; and
   writing a second portion of the data to the first subset of registers.

9. The method of claim 1, wherein the identifying the change in the execution mode is performed by a loader associated with the processor.

10. The method of claim 1, wherein the identifying the change in the execution mode is performed by circuitry within the processor.

11. The method of claim 1, wherein the identifying the change in the execution mode comprises tracking the execution mode for each instruction in the sequence of instructions.

12. The method of claim 1, further comprising:
   determining that the number of register accesses is less than a threshold value;
   reorganizing a portion of the data stored in registers specified as operands of a first instruction associated with the second execution mode;
   executing the first instruction; and
   reorganizing the portion of the data stored in the registers according to the first execution mode.

13. The method of claim 1, wherein the reorganizing further comprises passing data stored in a first register in the set of registers through a processing pipeline including arithmetic logic units and storing the data to a second register in the set of registers.

14. The method of claim 1, wherein at least two operands are stored in a first register in the set of registers for the first mapping and only one of the at least two operands is stored in the first register for the second mapping.

15. A non-transitory computer-readable storage medium storing instructions that, when executed by a processor, cause the processor to perform steps comprising:

receiving a sequence of instructions for execution by a processor;

identifying a change in an execution mode from a first execution mode to a second execution mode within the sequence of instructions, wherein a first register mapping is associated with the first execution mode and a second register mapping is associated with the second execution mode;

reorganizing data stored in a set of registers within a processor based on the first register mapping and the second register mapping in response to the change in the execution mode, wherein the first execution mode is used to perform vector operations on the data stored in the set of registers and the second execution mode is used to perform scalar operations on the data stored in the set of registers; and monitoring latency incurred for the reorganizing of the data and a number of register accesses between changes in the execution mode.

16. A system comprising:

a memory storing a sequence of instructions; and a processor that is coupled to the memory and configured to:

receive the sequence of instructions for execution;

identify a change in an execution mode from a first execution mode to a second execution mode within the sequence of instructions, wherein a first register mapping is associated with the first execution mode and a second register mapping is associated with the second execution mode;

reorganize data stored in a set of registers within the processor based on the first register mapping and the second register mapping in response to the change in the execution mode, wherein the first execution mode is used to perform vector operations on the data stored in the set of registers and the second execution mode is used to perform scalar operations on the data stored in the set of registers; and monitor latency incurred for the reorganizing of the data and a number of register accesses between changes in the execution mode.

17. The system of claim 16, wherein the processor is further configured to insert at least one instruction into the sequence of instructions to copy data from a first register in the set of registers to a second register in the set of registers.

* * * * *